July 11, 1939.  J. M. DALIMATA  2,166,042
FURROW BASIN FORMING ATTACHMENT FOR CULTIVATORS
Filed March 9, 1938　　2 Sheets-Sheet 1

Inventor
John M. Dalimata
By Clarence A. O'Brien
Hyman Berman
Attorneys

Patented July 11, 1939

2,166,042

UNITED STATES PATENT OFFICE 2,166,042

FURROW BASIN FORMING ATTACHMENT FOR CULTIVATORS

John M. Dalimata, Chester, Mont.

Application March 9, 1938, Serial No. 194,936

3 Claims. (Cl. 97—55)

This invention relates to new and useful improvements in agricultural implements and more particularly to an attachment for field cultivators.

The invention more specifically relates to a basin forming attachment for cultivators whereby moisture collecting basins can be formed in furrows in a more efficient manner than is now accomplished through machines of this nature at present in use.

An important object of the invention is to provide a furrow basin forming attachment of the character stated which can be attached to a field cultivator without modifying the construction thereof.

Another important object of the present invention is to provide a furrow basin forming attachment for cultivators whereby basins can be formed in certain furrows produced by a cultivating machine, in an automatic and positive acting manner and without scraping the bottom of the furrows, to the end that some of the mulch will be left in the furrows after the damming operations have taken place, thus serving to hold moisture in the basins and eliminating cracking of the furrows with the resulting loss of moisture.

Other important objects and advantages of the invention will become apparent to the reader of the following specification.

Figure 1:
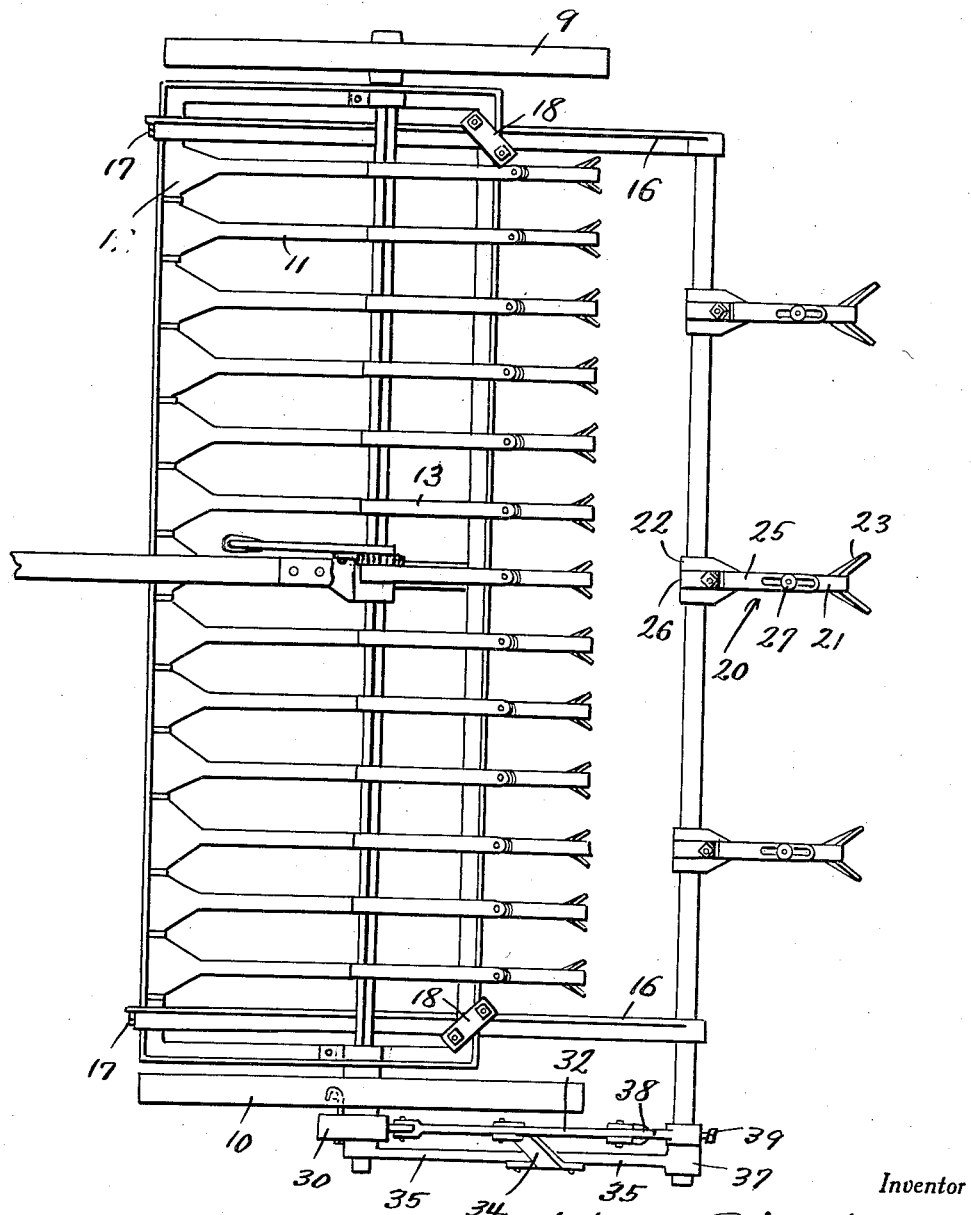
Figure 1 represents a top plan view of the cultivator and the attachment installed thereon.
Figure 2:
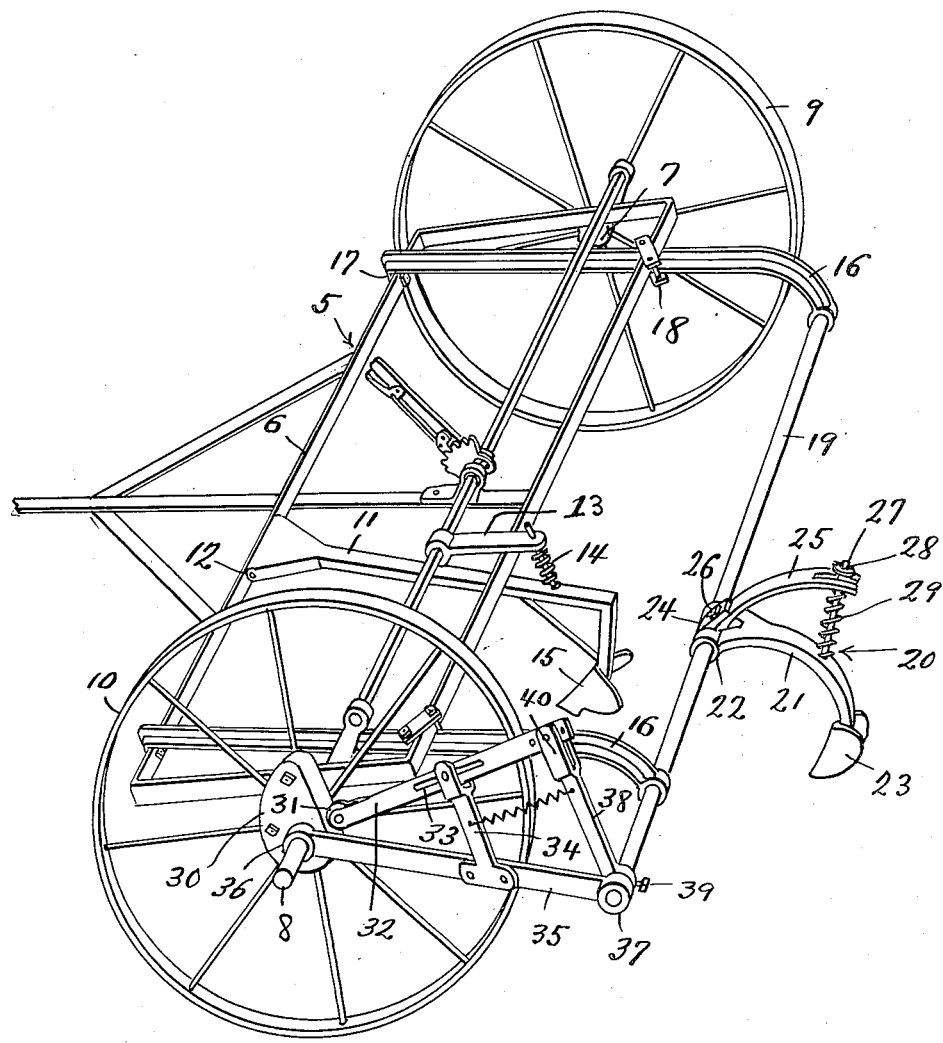
Figure 2 is a fragmentary perspective view showing certain of the cultivating elements and basin formers removed.

Referring to the drawings wherein like numerals designate like parts, it can be seen that numeral 5 generally refers to the cultivator of which numeral 6 denotes the rectangular-shaped frame which is provided with depending bearings 7 through which the axle 8 is disposed. The ends of this axle 8 are provided with the ground engaging wheels 9—10. As is customary, arms 11 pivotally connected as at 12 to the lower portion of the frame extend rearwardly and arms 13 on the axle 8 have spring means 14 interposed between the same and the arms 11 to normally urge the arms 11 downwardly with the lifters 15 engaging the ground.

In carrying out the present invention, beams 16—16 are disposed under the rear portion of the frame 6 and over the forward portion of the frame 6, at the ends of the frame, with clamp means 17 at their forward ends engaged with the frame and clamp means 18 clamping the rear portion of the frame against the beams.

The rear ends of these beams 16—16 curve downwardly and are connected by the bar 19.

On this bar 19 are arranged a plurality of basin forming units 20. It is thought that for the size of machine represented in the drawings, perhaps three of these units will be sufficient. Each of these units consists of an arm 21 having a barrel-like bifurcated formation 22 at one end through which the bar 19 is disposed while its opposite end is provided with the basin forming shovel 23. Disposed between the furcation of the arm 21 is the clamp 24 of the corresponding presser bar 25. A bolt 26 passes through this end portion of the bar 25 for clamping the bar firmly in place on the bar 19 and incidentally preventing self-adjustment of the arm 21 longitudinally on the bar 19.

A rod 27 extends upwardly from the arm 21 and through a slot in the presser bar 25 and this end of the rod 27 is threaded to accommodate the nut 28. On the rod 27 and interposed between the bar 25 and the arm 21 is the coiled compressible spring 29. Obviously, by feeding the nut 28 on the rod 27, proper tension can be placed on the arm 27 and its shovel 23.

To afford intermittent motion of the shovel 23 for the purpose of damming the selected furrows to form the basins, a cam 30 is provided on one end of the axle 8 and against this rise the roller 31 of the link member 32, which link member is provided with the longitudinal slot 33 therein for receiving the pin which passes through the bifurcated end of the post 34, this post rising from the supplemental brace 35, which has the collar 36 at one end for receiving the axle 8 and the collar 37 at its opposite end for receiving the adjacent end of the bar 19. A link 38 is secured at one end to the bar 19 by suitable means 39, its bifurcated end 40 pivotally receiving the remaining end of the link 32.

Obviously, as the machine is in operation, the cam 30 is rotating and as the roller 31 follows the cam a rocking motion is transmitted to the arm 38 and to the rod 39, which results in the lifting and lowering at predetermined intervals of the dam forming shovels 23.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. An attachment for cultivators of the lister type comprising a cultivator attachable frame structure, a furrow damming shovel unit rockably supported on the frame, and means whereby the said shovel unit is rocked at predetermined intervals, said frame including a rotatable bar, a driving connection between the bar and a movable part of the cultivator, said dam forming units being located on the said rotatable bar, each of the said units comprising a shovel having an arm swingably connected to the bar, a pressure bar rigidly connected to the rotatable bar, and spring means interposed between the pressure bar and the arm.

2. An attachment for cultivators of the lister type comprising a cultivator attachable frame structure, a furrow damming shovel unit rockably supported on the frame, and means whereby the said shovel unit is rocked at predetermined intervals, said frame including a rotatable bar, a driving connection between the bar and a movable part of the cultivator, said dam forming units being located on the said rotatable bar, each of the said units comprising a shovel having an arm swingably connected to the bar, a pressure bar rigidly connected to the rotatable bar, and spring means interposed between the pressure bar and the arm, and means for adjusting the said tensioning means.

3. An attachment for cultivators of the lister type comprising a cultivator attachable frame structure, a furrow damming shovel unit rockably supported on the frame, and means whereby the said shovel unit is rocked at predetermined intervals, said frame including a rotatable bar, a driving connection between the bar and a movable part of the cultivator, said dam forming units being located on the said rotatable bar, each of the said units comprising a shovel having an arm swingably connected to the bar, a pressure bar rigidly connected to the rotatable bar, and spring means interposed between the pressure bar and the arm, said arm being bifurcated at its point of connection with the rotatable bar, said pressure bar being rigidly clamped to the rotatable bar at a point between the furcations of the shovel arm.

JOHN M. DALIMATA.